Sept. 26, 1933. W. D. WALKER 1,928,579
METHOD OF SUPERIMPOSING A FOREGROUND OR IMAGE UPON A BACKGROUND IN PHOTOGRAPHY
Filed Feb. 18, 1927
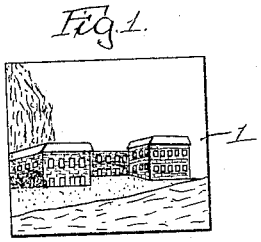
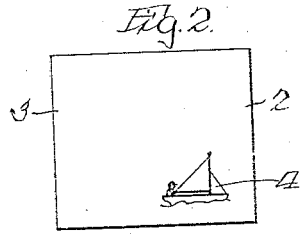
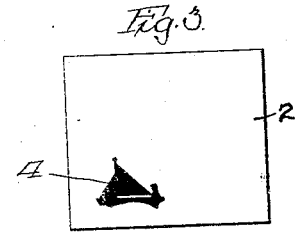
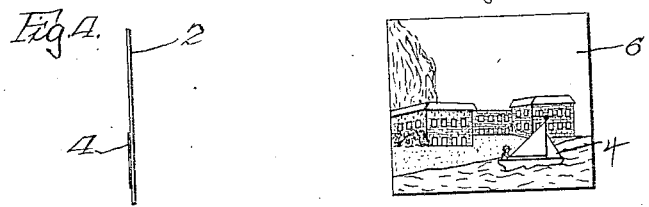
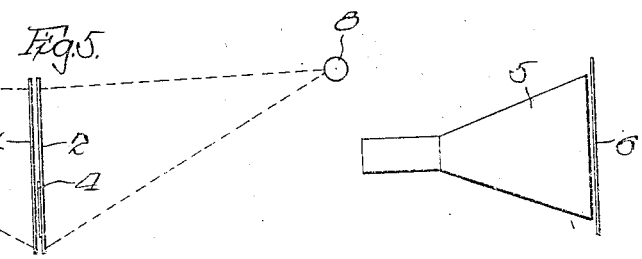
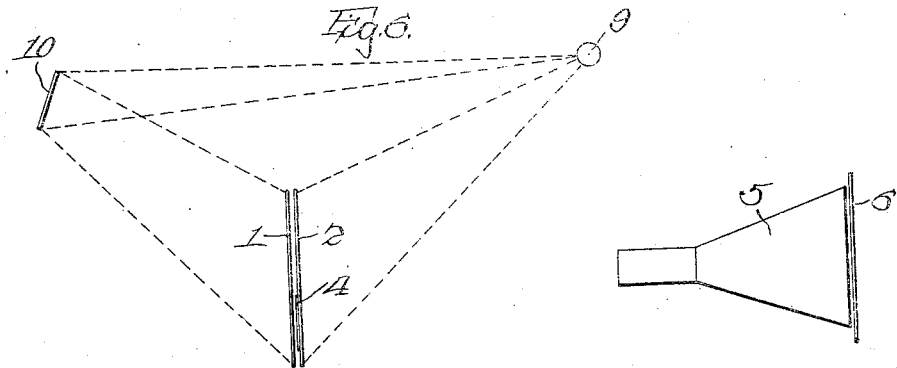
Inventor
Walter D. Walker Patented Sept. 26, 1933

1,928,579

UNITED STATES PATENT OFFICE 1,928,579

METHOD OF SUPERIMPOSING A FOREGROUND OR IMAGE UPON A BACKGROUND IN PHOTOGRAPHY

Walter D. Walker, Chicago, Ill., assignor, by direct and mesne assignments, to Cinema Development Company, Chicago, Ill., a corporation of Illinois Application February 18, 1927. Serial No. 169,173

17 Claims. (Cl. 88—16)

My invention relates to the method of superimposing a foreground or image upon a background in photography, and more particularly to improvements in the art of motion pictures by means of which the image or foreground, when superimposed, will appear as part of the original background in the finished picture.

The method consists broadly in producing the background and foreground films as desired, and the superimposing of the latter upon the former in a manner permitting a positive or negative film to be produced from a single exposure; the image on the foreground film preferably having the rear surface thereof coated, or otherwise treated so as to render the image impervious to the passage of light whereby, by the proper control of light, the relative illumination of the foreground upon the background may be controlled. By means of this arrangement, the proper brilliancy of both the background and foreground is obtained.

One of the important objects of my invention resides in the elimination of what is termed the fringe or grain which has heretofore appeared about the image when the image was superimposed upon the background by methods heretofore employed in the art.

Further objects and advantages of the invention will be apparent from the following detailed description of a preferred embodiment of this invention when taken in connection with the accompanying drawing forming a part thereof.

In the drawing:

Figure 1 is a front elevation of a background film;

Fig. 2 is a front elevation of a foreground film having an image thereon;

Fig. 3 is a rear elevation of the foreground film;

Fig. 4 is a side elevation of the foreground film;

Fig. 5 illustrates one of the various ways of placing the foreground film, containing the image, adjacent to the background film and controlling the illumination of each to permit photographing;

Fig. 6 illustrates substantially the same layout as Fig. 5 but showing a common source of illumination for the foreground and background films; and Fig. 7 is a front elevation of a finished film having the superimposed image on the background.

Those skilled in the art have heretofore experienced considerable difficulty in superimposing images upon background films. The advantages to be obtained by successfully eliminating these difficulties are well known.

At the present time, the background and foreground films are first made and the background is then blocked-out where the image is to be placed. The blocked-out portion must, therefore, exactly correspond in position and outline to that of the image. To locate the image accurately in this blocked-out portion has been found practically impossible. Overlapping will occur and cause what is known as grain or fringe, thus making it apparent when the picture is projected on the screen that the image or images have been inserted or superimposed, and thereby lessening the value of the picture.

According to my invention, the background film 1, illustrated in Fig. 1, may be made in the usual manner which generally consists of the scenery against which the actors are arranged to perform, or it may comprise photographs or paintings—of weird or grotesque character, if so desired. The image or foreground film 2, illustrated in Fig. 2, is adapted to be superimposed on the background film 1, so that the images thereon will appear in the final picture as part of the background. When photographing the foreground film containing the images, it is the general practice to have the actors arranged against a white screen if a positive foreground film as shown in Fig. 2 is to be used, so that the area 3 about the image film will be transparent.

If the color of the garments worn by the actors or the color of the images in general require photographing against a black screen, a positive print of the negative foreground film is not made, but the negative foreground film is directly used with a negative film of the background to carry out the superimposing process as shown in Figs. 5 and 6, whereby the picture taken will be a positive. In this case, the negative foreground film will also be transparent about the image, but such portions of the image as the sail of the boat shown in Fig. 2 will be dark.

My invention consists chiefly in applying a coating of material 4, which is impervious to light, on the rear surface of the foreground film 2, such as the surface remote from the lens of camera 5, and particularly over the image or images thereon. Material 4 may be of any desired kind and may be applied manually, chemically or mechanically, the purpose of the coating being to render the image impervious to the passage of light and to reflect the light used to illuminate the image.

The next step in the method herein disclosed consists in placing the films 1 and 2 in their proper relation, as shown in Fig. 5, so that, by proper illumination, a picture may be obtained by the use of the usual camera 5, producing a positive or negative film 6. It is obvious that any desired arrangement will accomplish this end, and therefore, I do not wish to be limited to a particular method of accomplishing this step. However, I preferably provide two sources of light 7 and 8, which may be suitably controlled, and which will properly illuminate the background and foreground films and provide the necessary brilliancy of the image on the foreground.

In Fig. 5 I have illustrated separate sources of light for the background film 1 and the foreground film 2, which permits independent control of the illumination of each. However, a single source of light 9 may be employed where it is not necessary to obtain an independent control of the illumination of the background and foreground films.

In Fig. 6, the source of light 9 is so located, relative to films 1 and 2, that a portion of the rays of light plays upon the foreground film 2, while other rays will be directed toward a mirror 10, which will reflect these rays to the rear of the background film 1. In any event, the illumination of the background may be so controlled as to properly illuminate the images on the foreground film 2, thereby producing the desired prominence thereof by illumination. It is possible to make the images stand out from the background on the finished picture any desired amount, by changing the relative distances therebetween, thereby obtaining the same advantages in superimposed pictures which are obtained if the actors were actually placed against the natural background.

The coating 4 imparts a desired advantage in that it prevents the passage of light through the image. The surrounding portions 3 of the foreground film may be transparent, if so desired, and hence, will not interfere with the photographing of the background. The illumination of the background permits the same to be viewed through the clear portions 3, while the coating 4 prevents the passage of the light illuminating the background which would otherwise destroy the image. On the other hand, it is apparent that the illumination of the background assists in lending prominence to the image if such illumination is properly controlled. The method herein disclosed being a true superimposing one, it is impossible for grain or fringe to appear on the finished picture. No fine edge will be left around the image, and consequently, there will be no vacancy to fill in and no traveling mat needed.

It is obvious, of course, that this invention also contemplates superimposing any number of images on a background to permit various groupings or positionings thereof.

Broadly the invention comprises placing the image and background films in coacting relation with material 4 to the rear of the image film to cover the image area.

Many advantages are to be obtained by the production of films which consist of superimposing images or foregrounds on backgrounds. For instance, a great saving of time and labor may be effected because the need for shipping the cast to distant points where the background is to be obtained, is eliminated, and the actors may remain in the studio throughout the year and thus be available when needed for other pictures. Other savings may also be effected in the motion picture art, particularly where portions of dead pictures may be used in producing new pictures.

Other advantages and objects will be apparent to those skilled in the art, and therefore, I do not wish to be limited to the exact details or steps described and shown herein, since many modifications are possible without departing from the spirit and scope of this invention.

I claim:

1. The method of superimposing an image upon a background which comprises preparing the rear surface of the image area to render it impervious to but reflective of light, then placing the background and image together in coacting relation and regulating the flow of light on both from different sources to obtain the proper illumination of each, and then photographing the same to provide a picture thereof.

2. The method of superimposing an image upon a background which comprises preparing the rear surface of the image area to render it impervious to but reflective of light, then arranging the image upon the background in coacting relation, then separately illuminating the image and the background, and finally photographing the same to obtain a picture thereof.

3. The method of superimposing an image upon a background which comprises providing a foreground film having the rear surface of the image area impervious to but reflective of light, then arranging the image film upon a background in the desired relation, then illuminating the image film and background and finally photographing the composite arrangement to obtain a picture thereof.

4. The method of superimposing an image upon a background which comprises providing a foreground film having the rear surface of the image area impervious to but reflective of light, then arranging the image film upon a background film in the desired relation, then illuminating the image film and the background film from different sources, and finally photographing the same to obtain a picture thereof.

5. The method of superimposing an image upon a background which comprises providing the rear surface of the image area impervious to but reflective of light, then arranging the image upon a background in the desired relation, then illuminating the image and the background and controlling the brilliancy of the illumination of each, and finally photographing the same to provide a picture thereof.

6. The method of superimposing an image upon a background which comprises preparing the rear surface of the image area to render it impervious to but reflective of light, then arranging the image upon the background in coacting relation and separately illuminating them to display the composite picture.

7. The method of superimposing a photographic image upon a background which comprises preparing the rear surface of the photographic image area to render it impervious to but reflective of light, then arranging the photographic image in coacting relation with the background, and finally subjecting the background and photographic image to illumination to display the composite picture.

8. The method of producing a composite picture which consists in taking a foreground film, the rear surface of the image area of which has been rendered impervious to but reflective of light, and arranging the foreground film in coacting relation with a background film to produce a composite picture.

9. The method of producing a composite picture which consists in taking a foreground film, the rear surface of the image area of which has been rendered impervious to but reflective of light, then arranging the image film in coacting relation with a background film to produce a composite picture, and finally photographing the composite picture.

10. The method of producing a composite photograph embodying two component parts, that includes making a transparent image of one component, making an image of the other component substantially uniformly opaque to light but reflective of light to show its image details, superposing the two images and illuminating the first image by transmitted light and the second mentioned image by reflected light, and exposing a fresh actinic surface to the first image and the second image so illuminated and superposed.

11. The method of producing a composite photograph embodying two component parts that includes simultaneously exposing a fresh actinic surface to one component with a photographic image of the other component interposed, said photographic image being treated to prevent interference between the details of said photographic image and of said other component which are to be impressed upon said fresh actinic surface, and separately illuminating said photographic image and said other component during their simultaneous exposure to impress the image details of both components on said fresh actinic surface.

12. The method of producing by a single exposure a composite picture embodying two component parts, one appearing as the foreground and the other appearing as the background upon the composite picture, without the details of the background interfering with the details of the foreground, that includes treating a photographic image of one component to prevent such interference when exposed with the other component before a fresh actinic surface, and separately illuminating and simultaneously exposing said photographic image and said other component, one in front of the other, to impress the image details of both components on said fresh actinic surface.

13. The method of producing a composite photograph embodying two component parts, one a foreground and the other a background, making at least one of said components a photographic image, providing the other component opaque to but reflective of light, arranging the photographic image and the other component in an optically superposed relation permitting a single exposure of these components to a fresh actinic surface, illuminating the photographic image by transmitted light and the other component by reflected light, controlling the illumination of these components to obtain the desired lighting balance therebetween, and making this single exposure of these components to produce a composite picture having images of the components balanced.

14. The method of producing a composite photograph embodying two component parts, one a foreground and the other a background, making at least one of said components a photographic image, providing the other component opaque to but reflective of light, arranging the photographic image and the other component in an optically superposed relation permitting a single exposure of these components to a fresh actinic surface, illuminating the photographic image by transmitted light and the other component by reflected light, and making this single exposure of these components to produce a composite picture.

15. The method of making composite pictures by a single exposure embodying two component parts that includes providing a transparency of one component, providing the other component light reflective and opaque to transmitted light, illuminating the first mentioned component by transmitted light and the last mentioned component by reflected light, placing the first component and the second component, one in front of the other, in a focal plane of a lens, and exposing to a fresh actinic surface also in focal plane of said lens whereupon a composite picture is obtained.

16. The method of producing composite pictures embodying two component parts that includes simultaneously projecting through a lens or lens system the reflectively illuminated image detail of an opaque component of varying light reflectivity on a fresh actinic surface, and modifying a source of transmitted light positioned rearwards of said opaque and light reflective component, also passing through said lens or lens system only to impress image details of the second component on said fresh actinic surface whereupon a composite picture of the two components will result.

17. The method of producing a composite photograph embodying two component parts, that includes making a transparent image of one component, making a photographic image of the other component, transforming said photographic image and thereby producing an image of the last mentioned component substantially uniformly opaque to light but reflective of light to show its image details, superposing the two images and illuminating the first image by transmitted light and the second mentioned image by reflected light, and exposing a fresh actinic surface to the first image and the second image so illuminated and superposed.

WALTER D. WALKER.